United States Patent
Rukletsov et al.

(10) Patent No.: US 12,141,310 B2
(45) Date of Patent: Nov. 12, 2024

(54) MULTI-ELEMENT SELECTION OF SUBTREES IN FIXED-DEPTH TREES

(71) Applicant: Red Hat, Inc., Raleigh, NC (US)

(72) Inventors: Alexander Rukletsov, Grasbrunn (DE); Malte Isberner, Grasbrunn (DE)

(73) Assignee: Red Hat, Inc., Raleigh, NC (US)

( * ) Notice: Subject to any disclaimer, the term of this patent is extended or adjusted under 35 U.S.C. 154(b) by 300 days.

(21) Appl. No.: 17/864,175

(22) Filed: Jul. 13, 2022

(65) Prior Publication Data
US 2024/0020403 A1    Jan. 18, 2024

(51) Int. Cl.
     *G06F 21/62*      (2013.01)

(52) U.S. Cl.
     CPC .. *G06F 21/6218* (2013.01); *G06F 2221/2141* (2013.01)

(58) Field of Classification Search
     CPC ................ G06F 21/6218; G06F 2221/2141
     USPC .............................................................. 726/1
     See application file for complete search history.

(56) References Cited

U.S. PATENT DOCUMENTS

| | | | |
|---|---|---|---|
| 7,281,002 | B2 | 10/2007 | Farrell |
| 10,049,134 | B2 | 8/2018 | Bordawekar et al. |
| 11,061,652 | B1 * | 7/2021 | Biswas ................... G06F 8/427 |
| 2019/0236189 | A1 * | 8/2019 | Jindal .................. G06F 16/2454 |
| 2022/0114003 | A1 | 4/2022 | Okman et al. |

FOREIGN PATENT DOCUMENTS

| | | | | |
|---|---|---|---|---|
| CN | 1707474 A | * | 12/2005 | |
| FR | 2810432 A1 | * | 12/2001 | ........... G06F 9/4443 |
| KR | 20190067193 A | * | 6/2019 | ........... G06F 16/901 |
| WO | WO-2020069765 A1 | * | 4/2020 | ......... G06F 16/2246 |

OTHER PUBLICATIONS

Liu et al., "Mining Frequent Embedded Subtree from Tree-Like Databases," 2011 International Conference on Internet Computing and Information Services, Hong Kong, China, 2011, pp. 3-7, doi: 10.1109/ICICIS.2011.8. (Year: 2011).*

Zaki, "Efficiently mining frequent trees in a forest: algorithms and applications," in IEEE Transactions on Knowledge and Data Engineering, vol. 17, No. 8, pp. 1021-1035, Aug. 2005, doi: 10.1109/TKDE.2005.125. (Year: 2005).*

(Continued)

*Primary Examiner* — Peter C Shaw
(74) *Attorney, Agent, or Firm* — Kilpatrick Townsend & Stockton LLP

(57) ABSTRACT

Systems and methods are disclosed for dynamic selection of resource objects in a cloud-based system. The method may comprise defining a scope group from a scope tree, via a dynamic query, wherein the dynamic query comprises executing a query on the scope tree, the query including a name-type rule, a label-type rule, or a combination thereof; and selecting a subtree of the scope tree, to include in the scope group, based on the query. One or more subtrees may be selected as part of a scope group which are then applied by a cloud operating system to control, allow, or prevent access and determine a user's worldview in regards to a networked cloud-based system with all its various components, applications and resources.

18 Claims, 6 Drawing Sheets

(56) References Cited

OTHER PUBLICATIONS

Liang et al., "Solutions of Permissions Management for Website Group System Based on Graduation Authorization," 2011 10th IEEE/ACIS International Conference on Computer and Information Science, Sanya, China, 2011, pp. 298-303, doi: 10.1109/ICIS.2011.54. (Year: 2011).*

Srichavengsup, "Performance evaluation of modified tree algorithm using adaptive permission probability control," 2012 International Conference on ICT Convergence (ICTC), Jeju, Korea (South), 2012, pp. 462-465, doi: 10.1109/ICTC.2012.6387176. (Year: 2012).*

Nguyen, et al., "ElasticFog: Elastic Resource Provisioning in Container-Based Fog Computing" IEEE Access, Electronic ISSN: 2169-3536, Oct. 20, 2020, pp. 183879-183890, vol. 8, 2020, South Korea.

Nguyen, et al., "Load-Balancing of Kubernetes-Based Edge Computing Infrastructure Using Resource Adaptive Proxy" MDPI, School of Information and Communication Engineering, Chungbuk National University, Korea, Sensor 2022, 2869, Apr. 8, 2022, pp. 1-16, South Korea.

Paik, et al., "Fast Extraction of Maximal Frequent Subtrees Using Bits Representation" ResearchGate, Journal of Information Science and Engineering, Mar. 2009, pp. 435-464, Seoul, South Korea.

Santos, et al., "Resource Provisioning in Fog Computing: From Theory to Practice" IEEE Conference on Network Softwarization, Jun. 24-28, 2019, 22 pages, Paris, France.

Santos, et al., "Towards Network-Aware Resource Provisioning in Kubernetes for Fog Computing applications" IEEE Conference on Network Softwarization, Ghent University, Department of Information Technology, pp. 351-359, Ghent, Belgium.

\* cited by examiner

MULTI-ELEMENT SELECTION OF SUBTREES IN FIXED-DEPTH TREES

FIELD

The present technology pertains to systems and methods for determining and applying access controls and authorizations for users in cloud-based systems and architectures. In particular, but not by way of limitation, the present technology provides systems and methods for multi-element selection of subtrees in fixed-depth trees.

BACKGROUND

Cloud systems generally use scope-less role-based access controls (RBAC) or storage-level, plug-in-based attribute-based access approaches (ABAC) to determine user authorizations, worldviews, and access to resources.

SUMMARY

In some embodiments the present technology is directed to a method for dynamic selection of resource objects in a non-static environment, the method comprising defining a scope group from a scope tree, via a dynamic query, wherein the dynamic query comprises executing a query on the scope tree, the query including a name-type rule, a label-type rule, or a combination thereof; and selecting a subtree of the scope tree, to include in the scope group, based on the query.

BRIEF DESCRIPTION OF THE DRAWINGS

In the description, for purposes of explanation and not limitation, specific details are set forth, such as particular embodiments, procedures, techniques, etc. to provide a thorough understanding of the present technology. However, it will be apparent to one skilled in the art that the present technology may be practiced in other embodiments that depart from these specific details.

The accompanying drawings, where like reference numerals refer to identical or functionally similar elements throughout the separate views, together with the detailed description below, are incorporated in and form part of the specification, and serve to further illustrate embodiments of concepts that include the claimed disclosure and explain various principles and advantages of those embodiments.

Figure 1:
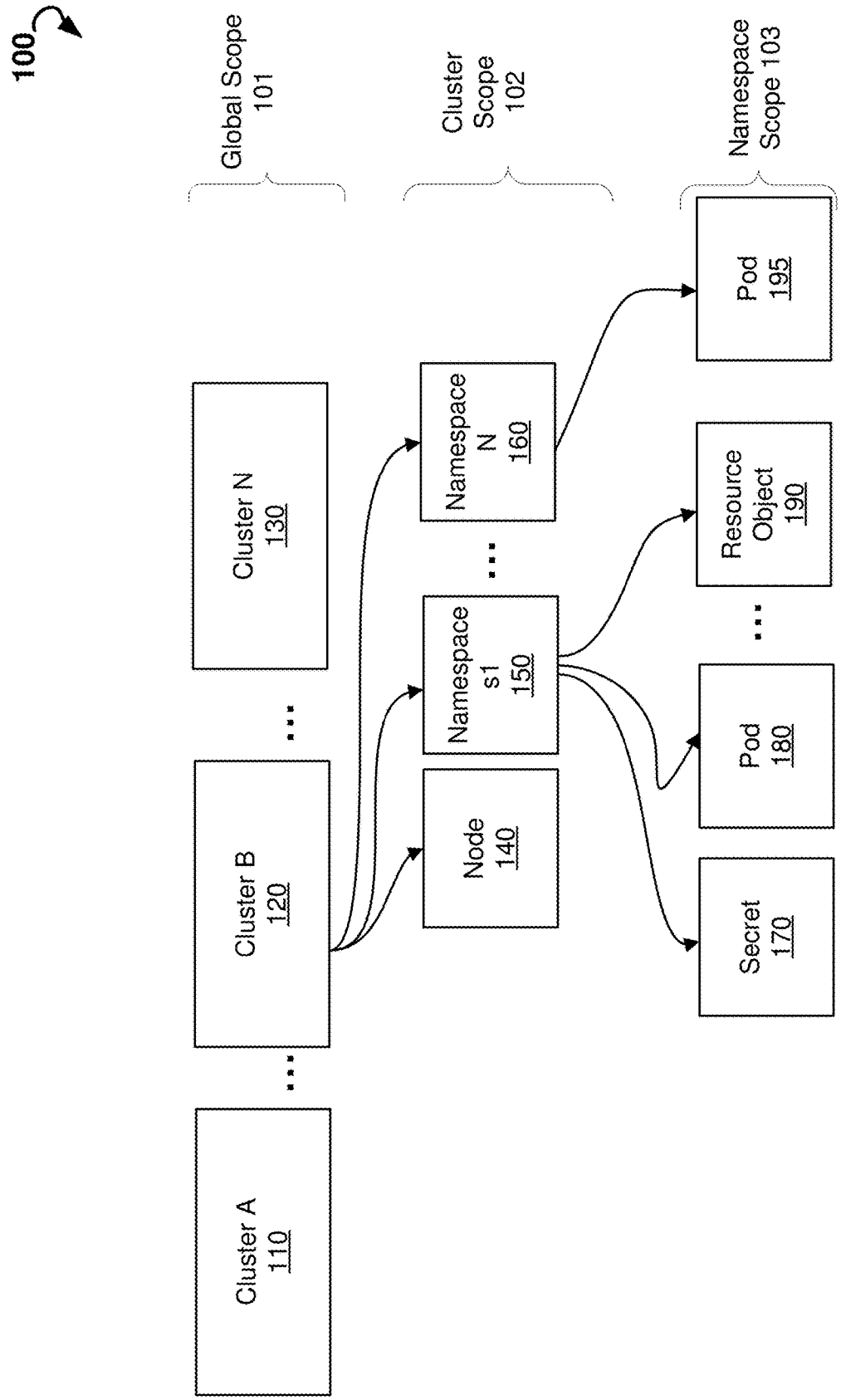

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 1 presents one embodiment of an example hierarchy of resource objects organized in a tree with fixed depth.

Figure 2:
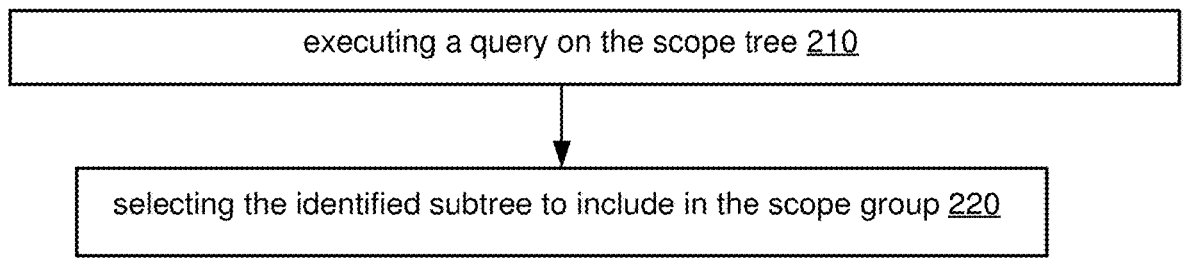

FIG. 2 presents an embodiment of a method to select subtrees for a scope group.

Figure 3:
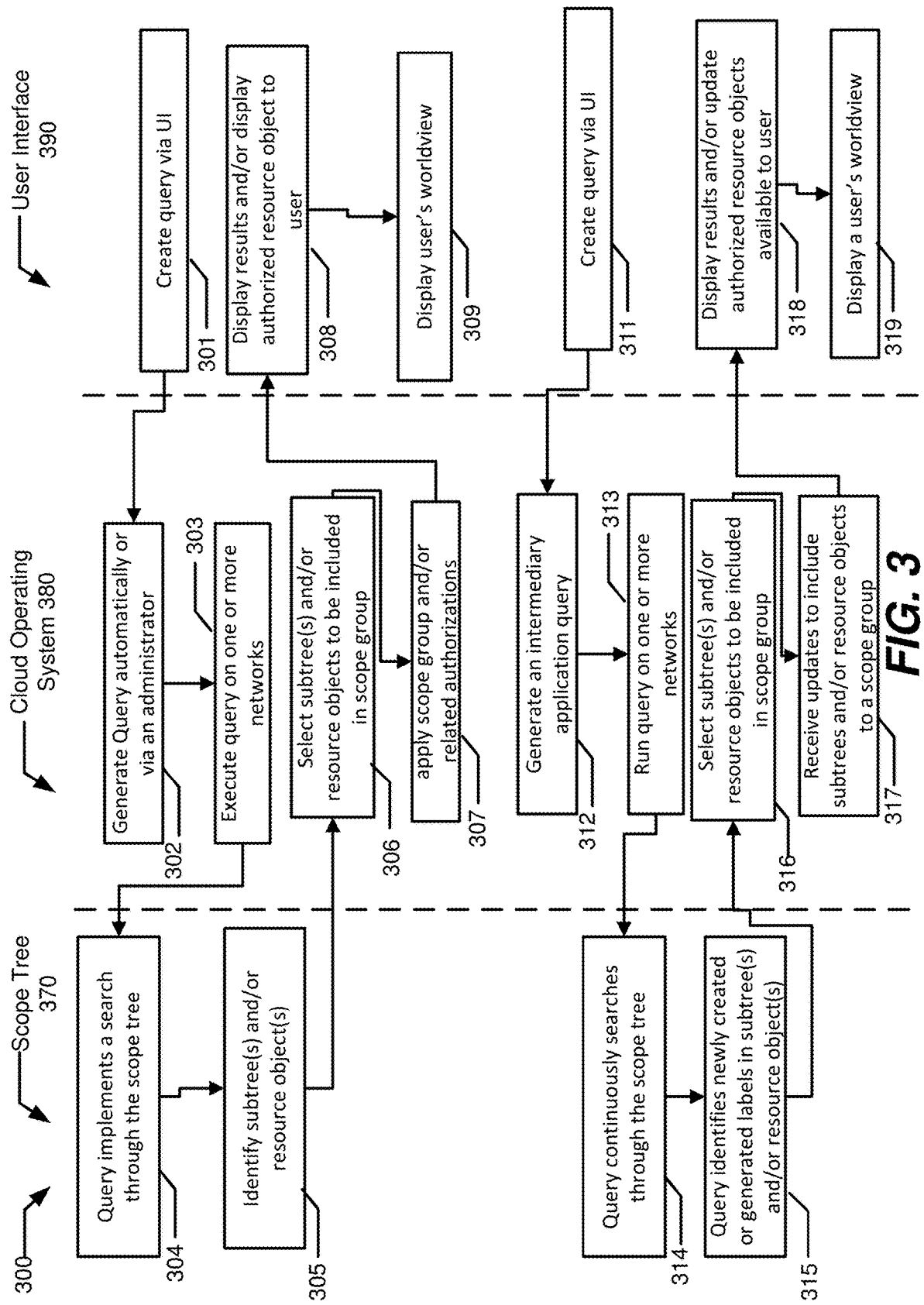

FIG. 3 presents the relationship between various components of a cloud system undertaking the various methods described herein.

Figure 4:
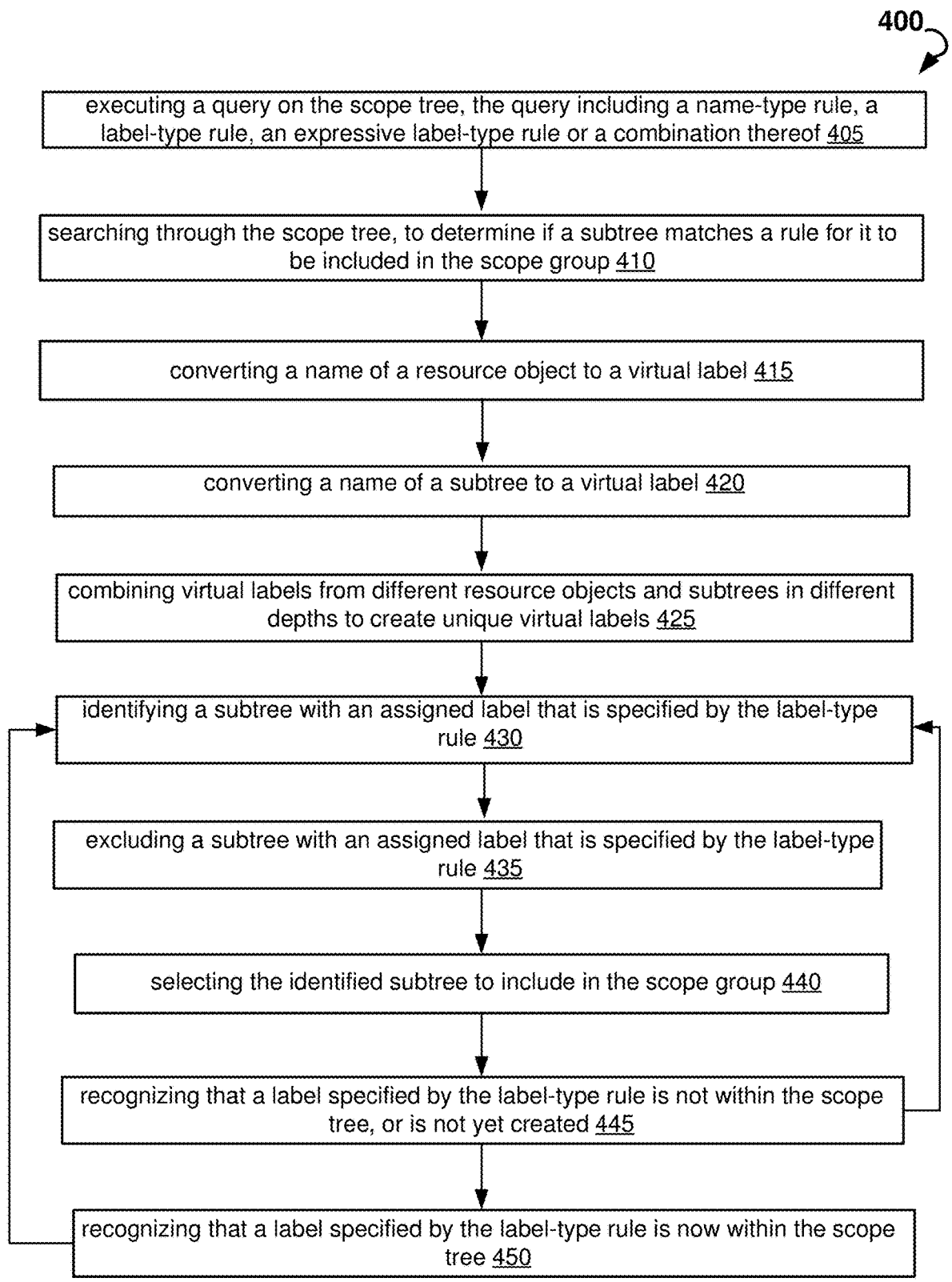

FIG. 4 presents a method of selecting a scope group based on queries utilizing expressive label-based rules.

Figure 5:
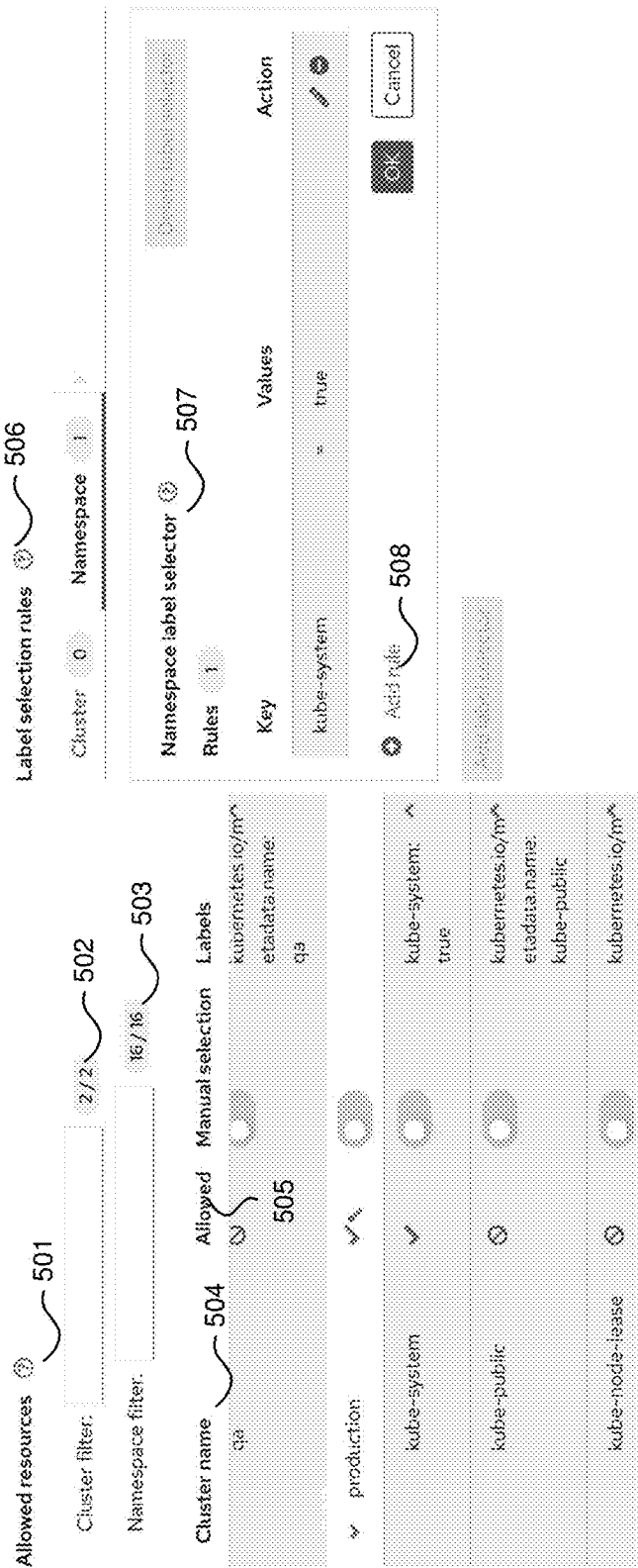

FIG. 5 presents a user interface to manage and view queries that may be used in the methods disclosed herein.

Figure 6:
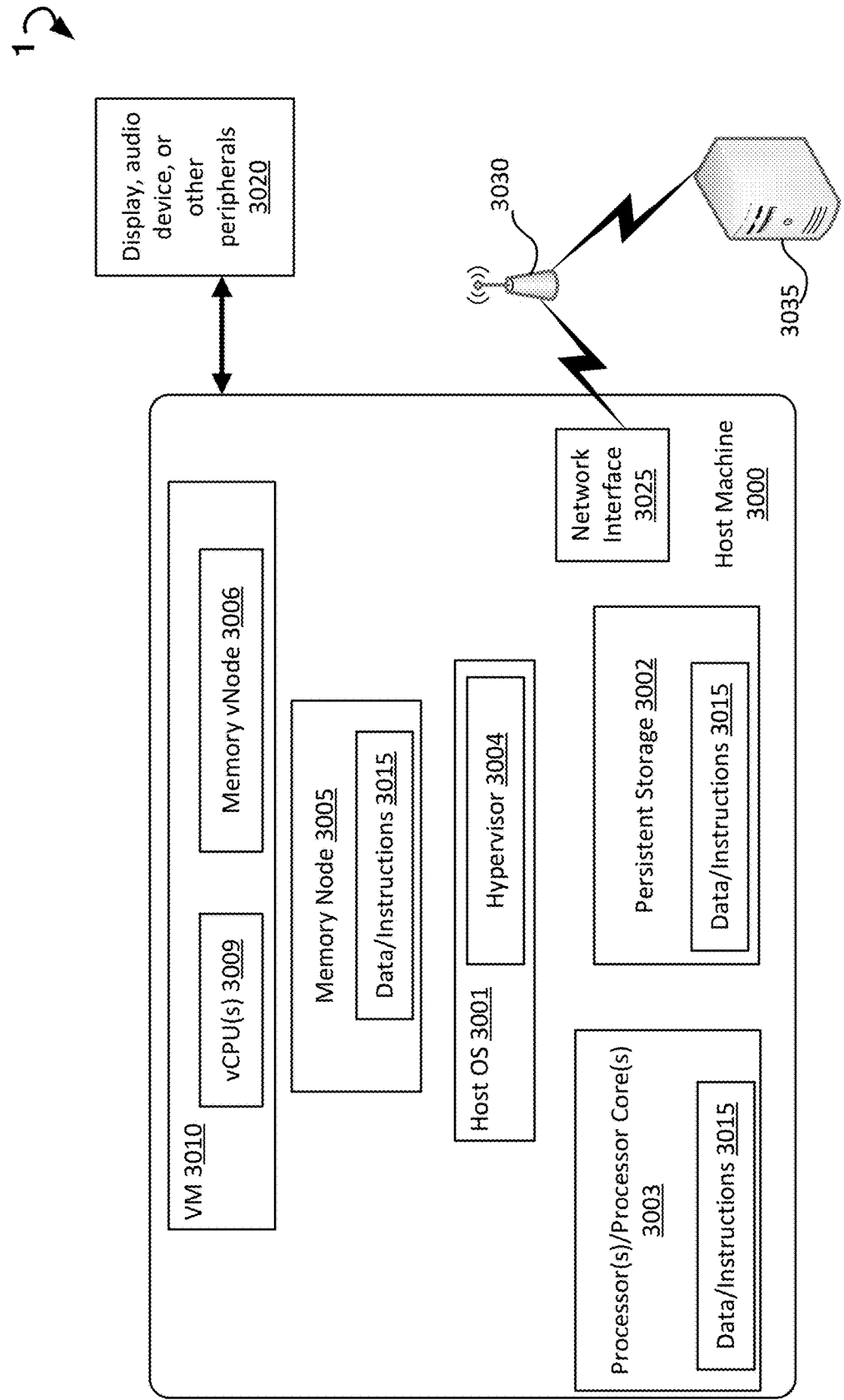

FIG. 6 is a diagrammatic representation of an example system that includes a host machine within which a set of instructions to perform any one or more of the methodologies discussed herein may be executed.

DETAILED DESCRIPTION

Before discussing specific embodiments and examples, some descriptions of terms used herein are provided below.

Scoping is a way to limit access to resources or data objects. A scope can refer to a unit of grouping for resources (e.g., cluster, namespace). Scopes are organized in a tree structure and include a cluster, namespace, or deployment for example. Different units of scopes may include a scope tree, which may define all the groups of resources or a defined set of such groups, while a scope or subtree is a smaller grouping of resources within a scope tree. Access scope, means a set of rules selecting scopes (clusters and namespaces) that access applies to.

Effective access scope or a scope group, may refer to one or more selected scopes or a collection of selected scope(s), usually resulting from applying an access scope, in preferred embodiments via a dynamic query to all clusters and namespaces. Access scope i.e., describes rules that define which resources may be accessed by a user or group of users, or rules determining the resources that a user or group of users have been provided access to, are differentiated from application scope, which relates to what other resources a resource object relates to or is associated with. A global resource object for example, may be outside of access scope, and in many embodiments these global resource objects are not subject to the scoping methods discussed herein, however they may in various embodiments of the presented technologies be relevant to application scope since they are still related to other resource objects in a cloud system.

An enclosing scope of a resource is the lowest possible scope that contains a resource. This is therefore the most refined and lowest depth sub-tree relative to that resource.

A fully qualified scope name uniquely identifies a scope across a cloud system, for example the Red Hat Advanced Cluster Security for Kubernetes cloud system, at any given point in time. It is composed of the scope's name together with the names of all parent scopes, e.g., my-cluster::my-namespace, cluster42.

Label-based rules, label-type rules, or by-label selection is a method of selecting scopes using labels attached to them. This method can match scopes across the scope hierarchy as well as scopes which will appear in the future.

Name-based rules, name-type rules, or by-name selection is a method of selecting scopes using their names. This method matches specific scopes if fully qualified scope names are used. Otherwise it is similar to the label-based selection and can match across the scope hierarchy and future scopes.

A cloud system, such as Red Hat Advanced Cluster Security for Kubernetes (also referred to herein as "RHACS"), provides access to various resource objects (e.g., deployments) grouped by their resource type (e.g., Deployment). All those resource objects form a tree with some fixed depth (e.g., cluster A—namespace 1-Deployment d). The problem is to enable finely-tuned access for the cloud system and various objects within it, i.e., allow administrators to write, deploy, or activate concise resource object selection rules which would scope down users' world view (e.g., "all deployments in namespace 1 in cluster A or "everything in clusters with label "tier=production"). Providing access to some clusters or resource objects, requires efficient selection or scoping methods, where the right resources are selected, i.e., relevant scope groups can be defined, for each user or application in an efficient manner, wherein the relevant scope groups contain the relevant system resource objects relevant to that user. An obvious method to define a scope group is by enumerating all objects by their names that must be selected. This method has significant drawbacks and is of little value in practice because of two primary concerns, the first being that future objects, undefined or uncreated at that time of writing or creating the scope query, cannot be selected because their names cannot always be known. The second reason is that specifying every single resource object and selecting them by enumeration is impractical, resource intensive, and time-consuming.

The presented technologies provide new system and methods to select scopes or scope groups to allow access to resource objects in a cloud-based system on an as-needed and highly tuned basis. The selected scope groups are then used to implement authorizations to parts of the system that are selected in the scope group, based on defined or provided user roles and rules related to each of these roles. The systems and methods presented herein define an access scope that are simple and concise for basic use cases, able to use expressive labels for complex use case and may be configured as code, and at the same time presented to and accessible by users with a specialized user interface ("UI"). In several aspects a query is transmitted that is able to define and select all relevant resource objects into a selected scope group, wherein the query is a combination of a collection of name-type and label-type rules, the query selecting any resource objects that meet criteria set by the collection of rules. In various embodiments, the query is implemented by searching and matching algorithms that iterate through various subtrees of a scope tree, and selecting matching subtrees into the scope group.

While the present technology is susceptible of embodiment in many different forms, there is shown in the drawings and will herein be described in detail several specific embodiments with the understanding that the present disclosure is to be considered as an exemplification of the principles of the present technology and is not intended to limit the technology to the embodiments illustrated.

FIG. 1 presents one embodiment of an example hierarchy of resource objects organized in a scope tree 100 with fixed depth. Namespace s1 150 is a unit of grouping resources organizing the resource objects in scope tree 100. In the disclosure presented herein, the scope tree 100 is utilized in a scoping model where every resource object belongs to exactly one enclosing scope, for example Namespace s1 150 is the enclosing scope for resources including secret 170, pod 180, and resource object 190. The exemplary simple scope tree 100 has a depth=2 which yields 3 scope levels, exemplary names for each level are provided for clarity: Global scope 101, Cluster scope 102, and Namespace scope 103. Various subtrees are present in scope tree 100 and may be present in any of the scope levels, including for example cluster A 110 in Global scope 101, Namespace N 160 in Cluster scope 102.

Furthermore, in the model presented herein, each resource object has exactly one unique name which takes into account its resource type and enclosing scope. In some circumstances, for example for secret resource objects, specialized or masked names may be given, for example "xyz" (e.g., different Secret objects can be named "xxx" if and only if they belong to different enclosing scopes, i.e., are in different subtrees). Finally, every resource object may optionally have a label in the form of "key=value" pairs. The exception to these rules may include optional scopeless global resource objects that are not subject to the various scoping methods in this disclosure.

For metadata to be sufficient for scoping, each scoped resource object must have at least one of a fully qualified scope name (includes both the cluster and namespace names), a label (such as a cluster label or a namespace label), or a cluster id. A cloud system operator might want to group individual resource objects into so called "scope groups" by some specific semantic criteria, e.g., all objects that can be accessed by members of some suborganization, or members with a specific assigned role.

FIG. 2 presents an embodiment of a method to select subtrees for a scope group. The method 200 may for example be used by a cloud system operator, an automated cloud system, or operating system, to select resource objects into a scope group by selecting subtrees in the respective scope tree, where the selected scope group will be one made up of various selected subtrees each with their resource objects. The Name-based rules utilized in method 200 are related to the subtree level, since in preferred embodiments, all selection is done on the subtree level and not on the leaves (i.e., selection is not done on the resource objects themselves but on a subtree which may be the resource object's enclosing scope). In many embodiments, by default, everything, and all subtrees are initially excluded from the access scope unless it is determined to be included in the scope group.

The method 200 proposed herein allows the use of a combination of label-based rules and name-based rules as well as being able to select subtrees and resource objects from different depth levels of a scope tree as well as from different sides of a scope tree, this method does not rely on enumeration or identifying each subtree or resource object in a list or individually. The method 200 allows in-hierarchy name-based selection, where a label equal to the object name is sufficient to uniquely identify an object. The method 200 allows one query to select resource objects and subtrees of various different types and include them in one scope group.

In this method 200, a scope group may be defined by a one or more rules, and in preferred embodiments a collection of rules. Each rule determines which subtrees of a scope tree shall be included into the scope group. A resource object is included if and only if it belongs to a subtree included by at least one rule in the query. In various embodiments, a query is executed 210 on the scope tree, for example a user may log in to a system, and their login attempt may trigger a query to determine what access the user has to resource objects in the cloud system. There are two types of rules that the query may include: name-based rules and label-based rules.

The query that is executed triggers a search or selection process based on name-based rules, label-based rules, or a combination of both to include subtrees in a defined or selected scope group. All queries whether they are name-based, label-based rules or a combination are implemented in the same manner, in some embodiments the implementation iterates through each subtree to determine whether it meets the criteria of any of the rules in the collection of rules in the query, whereby depending on the embodiment, the implementation may search through every subtree, resource objects, elements, or any other data objects in the scope tree depending on the specific system and the implementation mechanics it employs. In some embodiments, the implementation or search only iterates through each data or resource object in a subtree once a subtree has already been selected to be included in the scope group. In some embodiments, the implementation of the query attempts to identify whether a subtree alone matches a rule in a query, in other embodiments, the implementation of the query attempts to identify only resource objects that match a rule in a query, while in other embodiments both subtrees and resource objects are queried or iterated through by the system to determine whether they match or meet a condition of a rule in the query. In preferred embodiments, once either a subtree and/or a resource object in a subtree meets the specification or a criteria of a rule, then the subtree as a whole is then selected to be included in the scope group. In preferred embodiments, once a subtree is selected or has been deemed to meet the criteria of the rule or collection of rules in a query, then every node, or resource object in the subtree is also selected. In other embodiments of the present invention, a particular resource object must also meet the rule(s) in the query to be included in the scope group, even if a sub-tree it is included in has already been selected as part of the scope group.

A name-based rule identifies one subtree at most that matches a name (or portion of a name) in the query. In some embodiments this name, identification reference or number, or portion of a name or identification reference or number can exist in only one subtree for the name-based rule in the query to be valid. Once a matching subtree is identified then it is included or selected 220 to be in the selected scope group. In preferred embodiments, every element, resource object, or node in the identified or matching subtree is selected to be included into the scope group. Because Name-based rules allow the selection at most of one subtree, these name-type rules do not support cross-hierarchy selection in the scope tree. A query may also include Label-based rules that identify every subtree that contain a matching label. The label-based rules allow multiple subtrees to be identified, in contrast to the name-based rule that only allows the identification and selection of one subtree. After one or more subtrees are identified as containing a label specified by the label-based rule, then the identified subtree(s) may be selected to be included in the scope group.

A label-based rule may also be directed or designed to anticipate future labels, i.e., the label-based rule may include or allow the system or administrator to include or be directed towards labels that have not yet been created, or are not yet in use in the tree. For example, the label "marketing department" may not yet be in the system, or has not yet been authorized to be used in any cluster, namespace, subtree, or node, but a label-based rule is created to identify and/or select any subtrees with a "marketing department" label. The query would go out and not return any results, but once the label gets used or incorporated into the system the query whenever triggered (or in some cases it is continuous in operation) may recognize that the label has now been generated in the system and then commences to identify subtrees, and selects them to be included into the scope group because they meet the label-type rule which necessitates the use of the label "marketing department". In various embodiments an intermediary, that may be, or act as a continuous and dynamic application, applet, or container may be created or generated, that periodically or continuously checks for labels that are created in the system, to select every subtree with labels that match the rule, once a label is created or added to the system, or to a subtree in the system. Therefore, label-type rules are also future and forward-looking since they are able to be used to anticipate future labels, and their relevance to a scope group. In various embodiments, label matching may be undertaken according to the well-known kubernetes label selector mechanism.

FIG. 3 presents the architecture of the cloud system 300 wherein the methods described herein may be undertaken. The cloud system 300 may include a user interface 390, a cloud operating system 380 to run and manage the cloud system 300 and a scope tree 370 that may be comprised of any number of nodes, clusters, and networks of connected servers and computing devices or specific portions thereof. In one aspect of the present invention a dynamic query may be created 301, 311 by a user with a user interface. The dynamic query may also be automatically generated 302, 312 by the cloud operating system, for example in response to a new user logging into a system. The query is then transmitted 303, 305 by the operating system 380 to the various systems, computing devices, servers, databases and/ or networks that make up the scope tree 370. Scope tree 370 should contain the full worldview with all resource objects that are controlled or managed by the system, or in some embodiments at least contain all the resources that are relevant to specific portions of these networks and databases managed by the Cloud OS 380 system.

The query then implements a search 304 through the scope tree to identify 305 subtrees, and/or resource objects in some embodiments, that fulfil or meet criteria set by the one or more rules or collection of rules in the query. Once the subtrees and/or resource objects are identified they are selected 306 into a scope group, the cloud OS 380 then applies the authorizations or the access controls allowed by the scope group or implements these access levels or control settings for the user or application (if application access is sought by the query). The results generated or returned and the details of the scope group may be displayed 308, 318 in some embodiments to a user via a dedicated user interface, for example as shown in FIG. 5. Finally the user's world view is displayed 309, 319, for example the user settings may allow a user to see or view certain resource objects, access to them, and access to edit, read or write. An exemplary aspect may include a dedicated cloud-based storage and document management application, where the application is a subtree that is selected into a scope group, wherein the user may have access to read all data within the application. The query may also define rules for write or edit-access, and the resource objects/subtrees involved in the scope tree to allow a user to write into, edit, or save documents to the document management system may not be selected into the scope group based on the rules of the query that was generated for (or by) the user, and therefore the resource objects and their subtrees were not selected into the scope group, preventing the user from any write/edit access to documents in the document management application yet allowing the user to read files.

In some embodiments the query generated by a user 311, or automatically generated 312 by the Cloud OS 380 creates an intermediary application or agent that is executed or run 313 on the one or more networks of scope tree 370. The agent or application may be one that relies on label-type rules, some of which may include labels that are not yet in the scope tree 370. The query then continuously runs and searches 314 through the scope tree, or alternatively intermittently searches or runs on the scope tree based on set parameters. The automated, continuous and/or intermittent query identifies 315 newly created or generated labels in the subtree(s) and/or resource object(s) and selects identified subtree(s) and/or resource object(s) 316 to be included in the scope group. The selected scope group may be updated 317 and applied to user and their access settings (or to specific applications for application scope), and the results may be displayed or applied 319 on the user's worldview as described in foregoing paragraphs.

FIG. 4 presents a method 400 of selecting a scope group based on queries utilizing expressive label-based rules that are a variation of label-based rules discussed in FIG. 2. Similarly to method 200, method 400 begins by executing 405 a query that may be user generated or automated, the query contains one or more rules or a collection of rules, which in this method encompass at least one expressive label-based rule type. A search 410 is initiated through the search tree based on the rule(s) in the query to determine whether a subtree (and in some embodiments a resource object) meets the criteria set by the rule(s) to be included in the scope group.

In method 400, the label-based rules may also encompass expressive label-based rules, these expressive label-based allow for exclusion-based criterion to be incorporated in the rules. When utilizing exclusionary criterion, then in most embodiments, a scope group while still defined by a collection of rules, all the rules are label-based. While the use of name-type rules may be incorporated in some embodiments, the query would not allow for exclusions based on these name-type rules. In preferred embodiments, to support the use of both name-based and label-based rules, resource object name and names of all the scopes the object belongs to are converted to labels automatically.

The executed query iterates through the scope tree and converts 415 the names or identification references of each resource object 415 and/or subtree 420 to a virtual label. In several aspects of the invention, to support specific exclusions, virtual labels are added for every level of depth above the object in the hierarchy. The created virtual labels from each level of a resource object and/or subtree are then combined 425 to create unique virtual labels that take the place of names or unique reference IDs of each resource object and/or subtree. For example, a resource object secret 170 in FIG. 1 will be converted to have a unique virtual label by method 400. The format virtual label:name may be used where Cluster B 120 is converted: cluster="cluster B ", Namespace s1 150 is converted namespace=" namespace s1", and then these are combined 425 cluster:: namespace="cluster B::namespace 1" to describe the subtree of namespace s1. In some embodiments secret 170 may also be converted to a label for example secret="secret" and the combination of all three would create a unique virtual label for the resource object secret. However in various embodiments these conversions and virtual labels stop at the enclosing scope subtree level where selection of scope groups would occur.

These extra virtual labels allow now to leverage the well-known kubernetes label selector mechanism for name matching and benefit from its reverse match capability to support exclusion-based criteria in the grammar.

FIG. 5 presents a user interface to create, manage, and view queries that may be used in the methods disclosed herein. The user interface 500 may include an allowed resources section 501 which may list all the resource objects that are available to a user based on their worldview or allowed access settings. It may also include in some aspects, the complete worldview available to any type of user, for example a system administrator. A cluster filter section 502 allows a user to view, select, or unselect the applied cluster filters, while the namespace filter section 503, allows a user to view, select, or unselect applied filter to a namespace. A list of cluster names 504 of the networks may be displayed and showing which are allowed and not allowed 505 based on the applied rules. The label selection rules section 506 allows a user to set or view the label selection rules in a query, where cluster or namespace label selector interfaces 507 may include the ability to allow a user to select specific labels for namespaces and labels for clusters. Additional rules may also be added via a button interface 508 to allow the selection, creation, or deployment of multiple rules on a cluster or namespace.

FIG. 6 is a diagrammatic representation of an example system 1, with a host machine 3000, within which a set of instructions for causing the machine to perform any one or more of the methodologies discussed herein may be executed. In various example embodiments, the machine operates as a standalone device or may be connected (e.g., networked) to other machines. In a networked deployment, the host machine 3000 may operate in the capacity of a server or a client machine in a server-client network environment, or as a peer machine in a peer-to-peer (or distributed) network environment. The host machine 3000 may be a computer or computing device, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example system 1 includes the host machine 3000, running a host operating system (OS) 3001 on a processor or multiple processor(s)/processor core(s) 3003 (e.g., a central processing unit (CPU), a graphics processing unit (GPU), or both), and various memory nodes 3005. Host OS 3001 may include a hypervisor 3004 which is able to control the functions and/or communicate with a virtual machine ("VM") 3010 running on machine readable media. VM 3010 may also include a virtual CPU or vCPU 3009. Memory nodes 3005, and 3007 may be linked or pinned to virtual memory nodes or vNodes 3006 respectively. When a memory node 3005 is linked or pinned to a corresponding virtual node 3006, then data may be mapped directly from the memory nodes 3005 to their corresponding vNodes 3006.

All the various components shown in host machine 3000 may be connected with and to each other, or communicate to each other via a bus (not shown) or via other coupling or communication channels or mechanisms. The host machine 3000 may further include a video display, audio device or other peripherals 3020 (e.g., a liquid crystal display (LCD), alpha-numeric input device(s) including, e.g., a keyboard, a cursor control device, e.g., a mouse, a voice recognition or biometric verification unit, an external drive, a signal generation device, e.g., a speaker) a persistent storage device 3002 (also referred to as disk drive unit), and a network interface device 3025. The host machine 3000 may further include a data encryption module (not shown) to encrypt data.

The components provided in the host machine 3000 are those typically found in computer systems that may be suitable for use with embodiments of the present disclosure and are intended to represent a broad category of such computer components that are known in the art. Thus, the system 1 can be a server, minicomputer, mainframe computer, or any other computer system. The computer may also include different bus configurations, networked platforms, multi-processor platforms, and the like. Various operating systems may be used including UNIX, LINUX, WINDOWS, QNX ANDROID, IOS, CHROME, TIZEN, and other suitable operating systems.

The disk drive unit 3002 may also be a Solid-state Drive (SSD), a hard disk drive (HDD) or other includes a computer or machine-readable medium on which is stored one or more sets of instructions and data structures (e.g., data or instructions 3015) embodying or utilizing any one or more of the methodologies or functions described herein. The instructions 3015 may also reside, completely or at least partially, within the main memory node 3005 and/or within the processor(s) 3003 during execution thereof by the host machine 3000. The processor(s) 3003, and memory nodes 3005 may also comprise machine-readable media.

The instructions 3015 may further be transmitted or received over a network 3030 via the network interface device 3025 utilizing any one of several well-known transfer protocols (e.g., Hyper Text Transfer Protocol (HTTP)). The term "computer-readable medium" or "machine-readable medium" should be taken to include a single medium or multiple medium (e.g., a centralized or distributed database and/or associated caches and servers) that store the one or more sets of instructions. The term "computer-readable medium" shall also be taken to include any medium that is capable of storing, encoding, or carrying a set of instructions for execution by the machine 3000 and that causes the machine 3000 to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized to implement any of the embodiments of the disclosure as described herein.

The computer program instructions may also be loaded onto a computer, a server, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 3030 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the host machine 3000, with each server 3035 (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++, or the like and conventional procedural programming languages, such as the "C" programming language, Go, Python, or other programming languages, including assembly languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The foregoing detailed description includes references to the accompanying drawings, which form a part of the detailed description. The drawings show illustrations in accordance with exemplary embodiments. These example embodiments, which are also referred to herein as "examples," are described in enough detail to enable those skilled in the art to practice the present subject matter.

The various embodiments described above, are presented as examples only, and not as a limitation. The descriptions are not intended to limit the scope of the present technology to the forms set forth herein. To the contrary, the present descriptions are intended to cover such alternatives, modifications, and equivalents as may be included within the spirit and scope of the present technology as appreciated by one of ordinary skill in the art. Thus, the breadth and scope of a preferred embodiment should not be limited by any of the above-described exemplary embodiments.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel or may be performed at different times.

The embodiments can be combined, other embodiments can be utilized, or structural, logical, and electrical changes can be made without departing from the scope of what is claimed. The detailed description is, therefore, not to be taken in a limiting sense, and the scope is defined by the appended claims and their equivalents. In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described to best explain the principles of the present technology and its practical application, and to enable others of ordinary skill in the art to understand the invention for various embodiments with various modifications as are suited to the particular use contemplated.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference, and the disclosure expressly set forth in the present application controls.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one", and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one", and indefinite articles such as "a" or "an" (e.g., "a", and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A, and B together, A, and C together, B, and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A, and B together, A, and C together, B, and C together, and/or A, B, and C together, etc.). It will be further understood by those within the art that typically a disjunctive word, and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A, and B."

With respect to the appended claims, those skilled in the art will appreciate that recited operations therein may generally be performed in any order. Also, although claim recitations are presented in a sequence(s), it should be understood that the various operations may be performed in other orders than those which are described, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect,", an embodiment", "one embodiment", "an exemplification," "one exemplification,", and the like means that a particular feature, structure, or characteristic described in connection with the aspect is included in at least one aspect. Thus, appearances of the phrases "in one aspect," "in an aspect," "in an exemplification,", and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Directional phrases used herein, such as, for example, and without limitation, top, bottom, left, right, lower, upper, front, back, and variations thereof, shall relate to the orientation of the elements shown in the accompanying drawing, and are not limiting upon the claims unless otherwise expressly stated.

The terms "about" or "approximately" as used in the present disclosure, unless otherwise specified, means an acceptable error for a particular value as determined by one of ordinary skill in the art, which depends in part on how the value is measured or determined. In certain aspects, the term "about" or "approximately" means within 1, 2, 3, or 4 standard deviations. In certain aspects, the term "about" or "approximately" means within 50%, 200%, 105%, 100%, 9%, 8%, 7%, 6%, 5%, 4%, 3%, 2%, 1%, 0.5%, or 0.05% of a given value or range.

In this specification, unless otherwise indicated, all numerical parameters are to be understood as being prefaced, and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits, and by applying ordinary rounding techniques.

Any numerical range recited herein includes all sub-ranges subsumed within the recited range. For example, a range of "1 to 100" includes all sub-ranges between (and including) the recited minimum value of 1, and the recited maximum value of 100, that is, having a minimum value equal to or greater than 1, and a maximum value equal to or less than 100. Also, all ranges recited herein are inclusive of the end points of the recited ranges. For example, a range of "1 to 100" includes the end points 1, and 100. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

The terms "comprise" (and any form of comprise, such as "comprises", and "comprising"), "have" (and any form of have, such as "has", and "having"), "include" (and any form of include, such as "includes", and "including"), and "contain" (and any form of contain, such as "contains", and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

What is claimed is:

1. A method for dynamic selection of resource objects in a non-static environment, the method comprising:
   defining a scope group from a scope tree, via a dynamic query, wherein the dynamic query comprises:
   executing a query on the scope tree, the query including a name-type rule, a label-type rule, or a combination thereof; and
   selecting a subtree of the scope tree, to include in the scope group, based on the query, wherein the subtree includes a resource object that belongs exclusively to the subtree of the scope tree, and wherein the resource object is configurable to be a node, deployment, secret, or route.

2. The method of claim 1, wherein the selecting the subtree is based on the name-type rule, the selecting comprising:
   identifying the subtree based on its unique identifier that is specified by the name-type rule, wherein the unique identifier is associated exclusively to the subtree; and
   selecting the identified subtree to include in the scope group.

3. The method of claim 1, wherein the selecting the subtree is based on the label-type rule, the selecting comprising:

identifying a subtree with an assigned label that is specified by the label-type rule; and
selecting the identified subtree to include in the scope group.

4. The method of claim 1, wherein the selecting the subtree is based on the label-type rule, the selecting comprising:
recognizing that a label specified by the label-type rule is not within the scope tree, or is not yet created;
identifying a subtree with a newly created assigned label specified by the label-type rule; and
selecting the identified subtree to include in the scope group.

5. The method of claim 1, wherein a subtree includes at least one resource object.

6. The method of claim 1, further comprising:
controlling a user's world view in a cloud system based on the defined scope group and resource objects within the scope group.

7. The method of claim 5, wherein controlling the user's world view includes at least one of the following:
displaying to the user via a user interface only resource objects within the defined scope group,
preventing the user read access to the resource objects outside the defined scope group, and
preventing the user write access to the resource objects outside the defined scope group.

8. The method of claim 1, wherein the selecting a subtree based on the label-type rule comprises:
executing a kubernetes label selector mechanism.

9. The method of claim 1, wherein the dynamic query further comprises:
converting a name of a resource object to a virtual label;
converting a name of each subtree in each level of depth in the scope tree to a virtual label; and
combining the virtual labels from resource objects and subtrees to produce a virtual label identifier for each resource object and each subtree in the scope tree.

10. The method of claim 9, wherein the dynamic query further comprises:
excluding a subtree or resource object from inclusion into the scope group based on the label-type rule that specifies at least one virtual label identifier to exclude.

11. The method of claim 1, wherein the dynamic query further comprises:
executing an intermediary application that is run constantly or intermittently;
dynamically identifying via the intermediary application, newly created labels that meet criteria set by the label-type rule; and
selecting a subtree of the scope tree, to include in the scope group, based on the label-type rule.

12. A cloud-based security system comprising:
a database;
a server, the server and the database managed via a cloud-based operating system, the server comprising a processor and a memory storing instructions that, when executed by the processor, are effective to program the at least one processor to:
define a scope group from a scope tree, via a dynamic query, wherein the scope group includes nodes or clusters, and wherein the dynamic query comprises instructions to:
execute a query on the scope tree, the query including a name-type rule, a label-type rule, or a combination thereof; and
select a subtree of the scope tree, to include in the scope group, based on the query, wherein the subtree includes a resource object that belongs exclusively to the subtree of the scope tree, and wherein the resource object is configurable to be a node, deployment, secret, or route.

13. The system of claim 12, wherein the instructions to select a subtree are based on the name-type rule, the instructions comprise:
identify the subtree based on its unique identifier that is specified by the name-type rule, wherein the unique identifier is associated exclusively to the subtree; and
select the identified subtree to include in the scope group.

14. The system of claim 12, wherein the instructions to select a subtree are based on the label-type rule, the instructions comprise:
identify a subtree with an assigned label that is specified by the label-type rule; and
select the identified subtree to include in the scope group.

15. The system of claim 12, wherein the instructions to select a subtree are based on the label-type rule, the instructions comprise:
recognize that a label specified by the label-type rule is not within the scope tree, or is not yet created;
identify a subtree with a newly created assigned label specified by the label-type rule; and
select the identified subtree to include in the scope group.

16. The system of claim 12, the instructions further comprising: control a user's world view in a cloud system based on the defined scope group and resource objects within the scope group, by considering at least one of the following:
display to the user via a user interface only resource objects within the defined scope group,
prevent the user read access to the resource objects outside the defined scope group, and
prevent the user write access to the resource objects outside the defined scope group.

17. The system of claim 12, wherein the dynamic query further comprises:
converting a name of a resource object to a virtual label;
converting a name of each subtree in each level of depth in the scope tree to a virtual label;
combining the virtual labels converted from resource objects and subtrees to produce a virtual label identifier for each resource object and each subtree in the scope tree; and
excluding a subtree or resource object from inclusion into the scope group based on the label-type rule that specifies at least one virtual label identifier to exclude.

18. A non-transitory computer-readable storage medium having embodied thereon a program, the program being executable by a processor to perform a method for dynamic selection of resource objects comprising:
defining a scope group from a scope tree, via a dynamic query, wherein the dynamic query comprises:
executing an instructional query on the scope tree; and
selecting a subtree of the scope tree, to include in the scope group, based on a name-type rule, a label-type rule, or a combination thereof, wherein the subtree includes a resource object that belongs exclusively to the subtree of the scope tree, and wherein the resource object is configurable to be a node, deployment, secret, or route; and
controlling a user's world view in a cloud system based on the defined scope group, wherein the controlling comprises at least one of the following:

displaying to the user via a user interface only resource objects within the defined scope group, preventing the user read access to the resource objects outside the defined scope group, and preventing the user write access to the resource objects outside the defined scope group.

* * * * *